United States Patent
Chu et al.

(10) Patent No.: US 6,509,932 B1
(45) Date of Patent: Jan. 21, 2003

(54) METHOD AND APPARATUS FOR PROVIDING AUDIO IN A DIGITAL VIDEO SYSTEM

(75) Inventors: Der-Ren Chu, San Jose, CA (US); Ren-Yuh Wang, Cupertino, CA (US)

(73) Assignee: Divio, Inc., Sunnyvale, CA (US)

( * ) Notice: Subject to any disclaimer, the term of this patent is extended or adjusted under 35 U.S.C. 154(b) by 0 days.

(21) Appl. No.: 09/410,445

(22) Filed: Oct. 1, 1999

Related U.S. Application Data

(60) Provisional application No. 60/104,957, filed on Oct. 20, 1998.

(51) Int. Cl.⁷ .................................................. H04N 9/64
(52) U.S. Cl. ....................................... 348/484; 348/714
(58) Field of Search ................................ 345/302, 428, 345/432; 348/714, 715, 716, 717, 718, 719, 484; H04N 9/64

(56) References Cited

U.S. PATENT DOCUMENTS

| | | | | |
|---|---|---|---|---|
| 5,404,248 A | * | 4/1995 | Shimoda et al. | 360/48 |
| 5,590,101 A | * | 12/1996 | Itoi | 369/32 |
| 5,594,660 A | * | 1/1997 | Sung et al. | 364/514 |
| 5,648,879 A | * | 7/1997 | Takano | 360/73.11 |
| 5,764,965 A | * | 6/1998 | Poimboeuf et al. | 395/551 |
| 5,805,469 A | * | 9/1998 | Okamoto et al. | 364/577 |
| 5,815,634 A | * | 9/1998 | Daum et al. | 386/96 |
| 6,049,769 A | * | 4/2000 | Holmes et al. | 704/278 |
| 6,167,083 A | * | 12/2000 | Sporer et al. | 375/240.01 |
| 6,125,233 A1 | * | 6/2001 | Higurashi | 386/108 |

* cited by examiner

*Primary Examiner*—John Miller
*Assistant Examiner*—Brian Yenke
(74) *Attorney, Agent, or Firm*—Townsend and Townsend and Crew, LLP

(57) ABSTRACT

A method and apparatus for providing audio in a digital video system. Equations for a value n are provided for replacement into the conventional audio data shuffling equations. The equations for the value n provide for simple, efficient techniques to, in turn, calculate values for track number (TK), block number (BK), and data position number (DP). The values TK, BK, DP can be used in an address generation scheme to generate a page value and an offset value. The page value and the offset value for a particular sample of digital audio data, in part, determine the location of the sample in a memory storing the digital audio data. The present invention can be implemented for both four channel and two channel modes under both the NTSC and the PAL standards in accordance with specifications set forth in the Digital Video Standard (the "Blue Book").

15 Claims, 5 Drawing Sheets

| | | 908 | 908 | 908 |
|---|---|---|---|---|
| TK 0/5 or 6 | BK 0 | Page 0 | Page 1 | Page 2 |
| | BK 1 | Page 3 | Page 4 | Page 5 |
| | BK 2 | Page 6 | Page 7 | Page 8 |
| | ⋮ | ⋮ | ⋮ | ⋮ |
| | BK 8 | Page 24 | Page 25 | Page 26 |
| TK 1/6 or 7 | BK 0 | Page 27 | Page 28 | Page 29 |
| | BK 1 | Page 30 | Page 31 | Page 32 |
| | ⋮ | ⋮ | ⋮ | ⋮ |
| | BK 8 | Page 51 | Page 52 | Page 53 |
| TK 2/7 or 8 | BK 0 | Page 54 | Page 55 | Page 56 |
| | BK 1 | Page 57 | Page 58 | Page 59 |
| | ⋮ | ⋮ | ⋮ | ⋮ |
| | BK 8 | Page 78 | Page 79 | Page 80 |
| TK 3/8 or 9 | BK 0 | Page 81 | Page 82 | Page 83 |
| | BK 1 | Page 84 | Page 85 | Page 86 |
| | ⋮ | ⋮ | ⋮ | ⋮ |
| | BK 8 | Page 105 | Page 104 | Page 103 |
| TK 4/9 or 10 | BK 0 | Page 108 | Page 109 | Page 120 |
| | BK 1 | Page 121 | Page 122 | Page 123 |
| | ⋮ | ⋮ | ⋮ | ⋮ |
| | BK 8 | Page 132 | Page 133 | Page 134 |
| TK 5/10 or 11 | BK 0 | Page 135 | Page 136 | Page 137 |
| | BK 1 | Page 138 | Page 139 | Page 140 |
| | ⋮ | ⋮ | ⋮ | ⋮ |
| | BK 8 | Page 159 | Page 160 | Page 161 |

*FIG. 7*

METHOD AND APPARATUS FOR PROVIDING AUDIO IN A DIGITAL VIDEO SYSTEM

CROSS-REFERENCES TO RELATED APPLICATIONS

This application claims priority from U.S. Provisional Patent Application No. 60/104,957, filed Oct. 20, 1998, which is incorporated herein by reference in its entirety for all purposes.

FIELD OF THE INVENTION

The present invention relates to the field of audio processing and, more particularly, to the field of audio data shuffling in a digital video environment.

BACKGROUND

The Digital Video (DV) format is quickly becoming the standard for many digital video applications, including consumer electronic video devices. For example, DV format camcorders can now be found with more frequency and at more competitive prices than the conventional analog 8 mm and VHS camcorders. At the same time, DV camcorders provide advantages which are inherent to digital technology, such as high quality of video and sound, digital filtering, digital error correction, and the like. DV provides quality at or higher than the high-end of the conventional analog camcorders such as Hi-8 mm and S-VHS, with much added flexibility. Also, digital format data can be repeatedly copied without loss of quality.

Applications involving digital video applications often involve digital audio data as well. In a typical prior art technique, the analog audio data is provided to an analog-to-digital converter. The analog-to-digital converter converts the analog audio data into digital audio data. The digital audio data may then be provided in the form of a bitstream to an audio processor. The audio processor shuffles the digital audio data in the bitstream. The shuffling of the audio digital data allows for more efficient storage of the digital audio data in a memory.

The Blue Book discusses two modes: a National Television System Committee (NTSC) standard and a Phase Alternation System (PAL) standard. Among other differences, the NTSC standard and the PAL standard require different techniques to shuffle digital audio data. To shuffle digital audio data, a track number, a block number, and a data position number are calculated to specify the location of a particular sample of a pair of digital audio data in a frame. For the NTSC standard, three separate calculations are required to determine the track number, block number, and a data position number for a sample. Likewise, for the PAL standard, another three distinct calculations are required to determine the track number, block number, and a data position number for a sample. The determination of the track number, the block number, and the data position for either standard requires relatively complex calculations involving a value n, where n designates the nth pair of digital audio data in the bitstream.

The implementation of conventional audio shuffling equations for both the NTSC standard and the PAL standard present significant disadvantages. For example, because conventional audio shuffling equations for the NTSC standard are different from those for the PAL standard, separate hardware is necessary to perform calculations associated with each system. As another example, performing the calculations for the track number, block number, and data position number requires the use of a multiplier and a divider. Such use is costly in terms of the dedicated space required on an integrated circuit to accommodate the multiplier and divider.

An innovative technique is necessary to overcome these and other disadvantages associated with the conventional shuffling of digital audio data. The innovation should provide a simple, efficient solution that may apply substantially equally for both the NTSC standard and the PAL standard in determining track number, block number, and data position number information. Such a solution would provide hardware savings and more versatility to digital audio data shuffling applications. Furthermore, the innovation should allow the calculation of a track number, block number, and a data position number in a manner that minimizes or eliminates the burdensome need for involved calculations. Such reduction or elimination would advantageously decrease the space on an integrated circuit dedicated to perform the involved calculations. In addition, to maximize economy and efficiency in applications involving both digital video data digital audio data, the innovation should allow the storage of shuffled digital audio data in unused portions of a memory that also stores digital video data.

SUMMARY OF THE INVENTION

The present invention solves the problems associated with the prior art by providing methods and apparatus for providing audio in a digital video system.

In accordance with one aspect of the present invention, a method and apparatus is provided for storing digital audio data in a memory. The memory has digital video data stored in a first portion of the memory. A set of values is calculated. The digital audio data is shuffled according to the set of values. The digital audio data is stored in a second portion of the memory, the second portion not identical to the first portion.

In another aspect of the present invention, a value n is determined. The set of values is determined based on the value of n.

In yet another aspect of the present invention, digital audio data is stored in a memory location based on the set of values.

These and various other embodiments of the present invention, as well as its advantages and features, are described in more detail in conjunction with the text below and attached figures.

DESCRIPTION OF THE SPECIFIC EMBODIMENTS

The method and apparatus for providing audio in a digital video system in accordance with the present invention is now described. The present invention is suitable for widely-used image compression standards that integrate various algorithms into a compression system, such as the standards specified in the Digital Video Standard (the "Blue Book" or DV standard), by the Joint Photographic Experts Group (the JPEG standard), and by the Motion Picture Experts Group (the MPEG standard).

Figure 1:
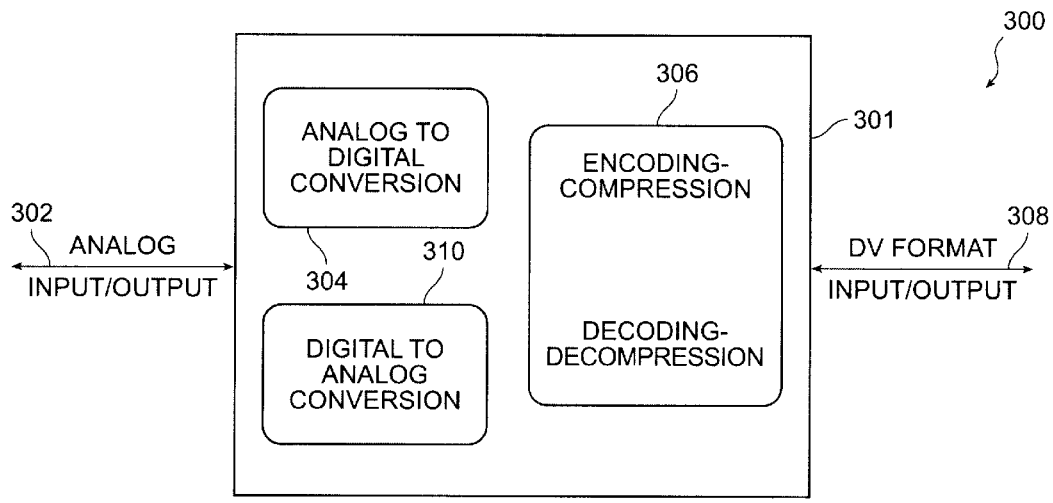
FIG. 1 illustrates a simplified block diagram of a system in accordance with the present invention.

FIG. 1 illustrates a simplified block diagram of a system 300 in accordance with the present invention. Block 301 converts analog data into DV format data, and vice versa. Analog data is input and output at an analog node 302. DV data is input and output at a DV node 308. The analog signals can include those for cable TV, analog camcorders, video cassette recorders, and other analog sources. The DV format data can include those for digital DV camcorders, digital video editors, other DV format equipment, and other forms of storage such as memory in a PC, set atop boxes, WebTV®, and the like.

When converting analog data to DV format, an A/D converter 304 converts the analog data received at the analog node 302 to digital data. The digital data from the A/D converter 304 is then input into a coding-compression block 306 for encoding and/or compression. The encoded/compressed data is then output at the DV node 308 in DV format.

When converting DV format data to analog data, DV format data is input into block 301 at the DV node 308. The DV format data is then decoded and/or decompressed by the coding-compression block 306. The decoded/decompressed data is then received by D/A converter 310 which converts the digital data to analog and then outputs the analog data at the analog node 302. Alternatively, blocks 304 and 310 can be implemented on the same chip or on two separate chips.

Figure 2:
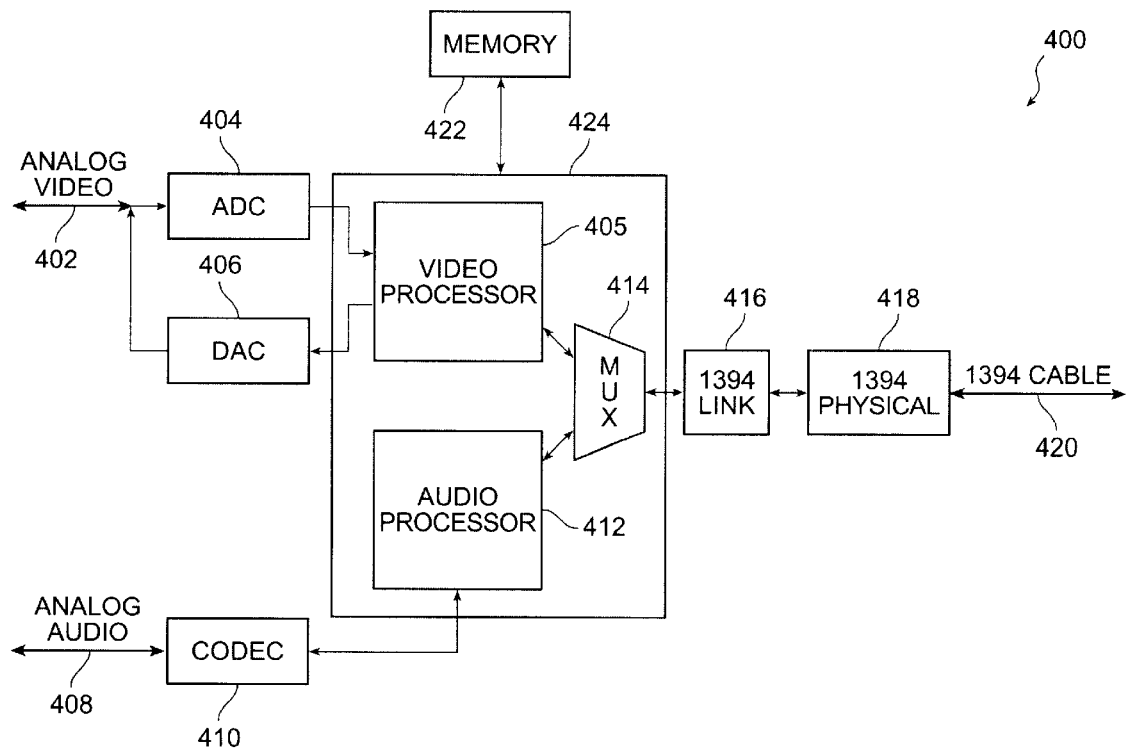
FIG. 2 illustrates a more detailed illustration of the system illustrated in FIG. 1.

FIG. 2 illustrates a system 400. The system 400 is a more detailed illustration of block 301 of FIG. 1. Analog video data is received at analog video node 402. The received data is then provided to an A/D converter 404 which converts the analog video data into a digital format. The digitized data from the A/D converter 404 is provided to a video processor 405 which performs video processing on the digitized video data. When outputting analog video data at the analog video node 402, a D/A converter 406 converts the digital analog video data from the video processor 405 into analog video data.

Audio data is received in analog format at an analog audio node 408. The analog audio data is provided to an audio converter 410. The audio converter 410 can convert analog audio data into digital format and vice versa. The audio converter 410 can be a Philips Electronics® UDA1344 or other suitable audio converter chips. The audio converter 410 is coupled to an audio processor 412. The audio processor 412 processes digital audio signals. The audio processor 412 can be any suitable audio processing chip such as digital signal processor (DSP) chips available from Texas Instruments®. A multiplexer 414 multiplexes data from/to the video processor 405 and the audio processor 412. The multiplexer 414 is coupled to a link chip 416. The link chip 416 is preferably a purely digital chip and provides a link layer for communication in accordance with 1394 standard originally designed by Apple Computer, Inc.® Currently, the 1394 standard can provide a bandwidth of 100 Mb/sec, 200, 400, or 800 Mb/sec. Other brands of link chips can also be used such as Texas Instruments® TSB12LV42 and Phillips Electronics® PDI1394L21. The link chip 416 is coupled to physical layer 418 which provides a connection in accordance with the 1394 standard. The physical layer 418 is coupled to a cable 420 which is also designed in accordance with standard 1394. The cable 420 can also be an optical cable.

FIG. 2 also illustrates a memory 422 which can be any type of storage such as dynamic random access memory (DRAM), extended output DRAM (EDO DRAM), synchronous DRAM (SDRAM), video RAM (VRAM), static RAM (SRAM), and the like. The memory 422 provides storage for devices within system 400 including storage for functions performed within block 424, such as functions performed by the video processor 405 and the audio processor 412. Additionally, some elements of the system 400 can have their own local memory.

Figure 3:
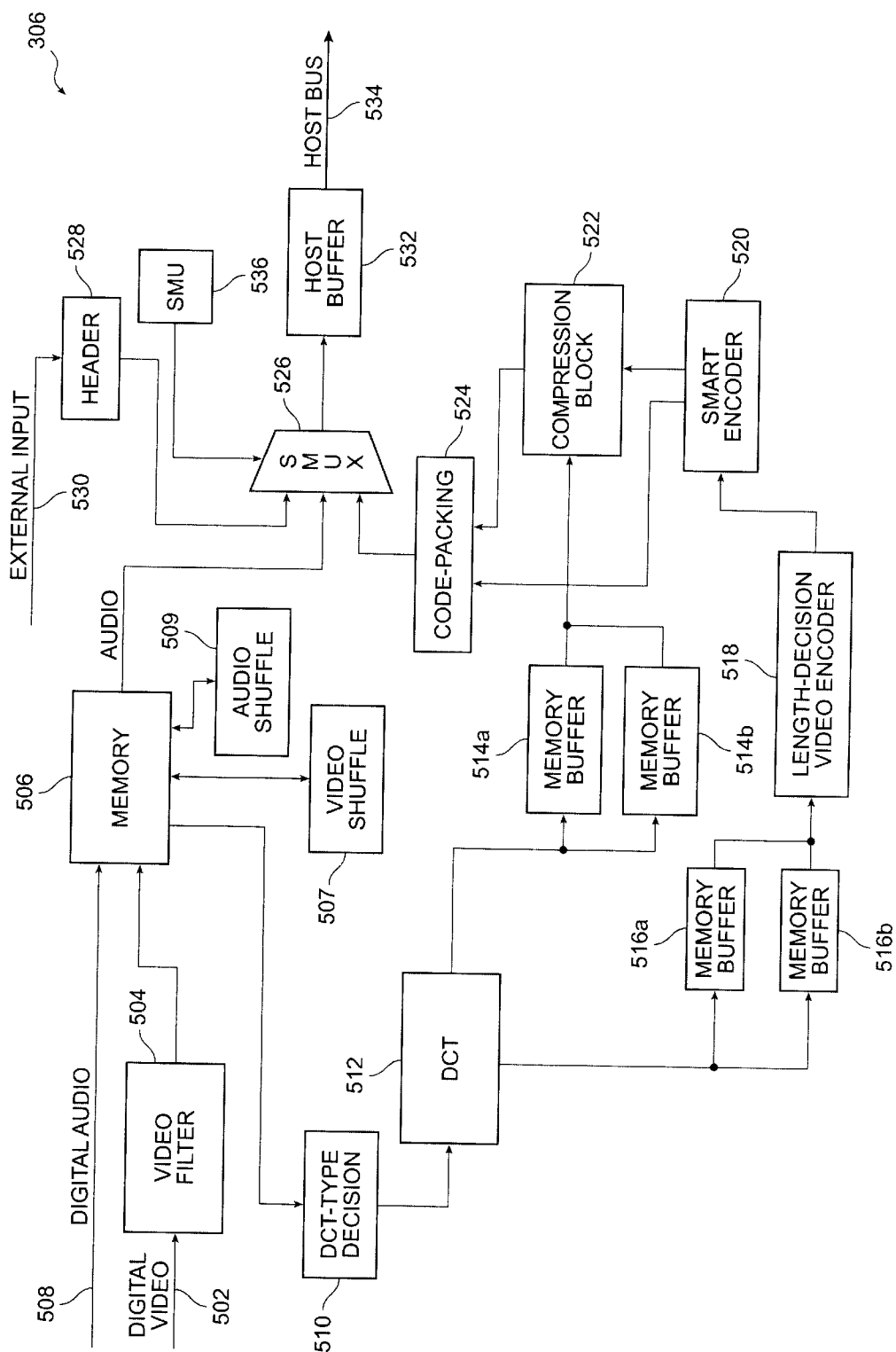
FIG. 3 illustrates a detailed block diagram of a coding-compression block illustrated in FIG. 1.

FIG. 3 illustrates a system 306. The system 306 is a more detailed block diagram of the coding-compression block 306 of FIG. 1. Digital video data is received at a video node 502. The received digital video data is preferably in 4:2:2 format, indicating four bytes of data for luminance (Y), two bytes of data for chrominance red (CR) and two bytes of data for chrominance blue (CB), respectively. The digital video data can be provided by any video decoder chip, such as Phillips Electronics® SAA7112. A video filter 504 performs filtering operations on the digital video data received at the video node 502. The filtering operations can include filtering for NTSC or PAL television system standards. For example, for NTSC the 4:2:2 format data can be filtered into 4:1:1 format. For PAL, the 4:2:2 format data can be filtered into 4:2:0 format data. Other filtering operations by the video filter 504 can include horizontal and vertical filtering to remove noise. The filtered video data from the video filter 504 can be stored in a memory 506. The video data can be arranged by a video shuffle block 507 to store the video data more efficiently in the memory 506. The memory 506 can also store digital audio data received at an audio node 508. An audio shuffle block 509 can arrange the audio data more efficiently in the memory 506. The memory 506 can be any type of storage such as DRAM, EDO DRAM, SDRAM, VRAM, SRAM, and the like. The memory 506 provides storage for devices within the system 306. Additionally, some elements of the system 306 can have their own local memory.

The video data stored in memory 506 can be retrieved by DCT-type decision block 510 (where DCT is discrete cosine transform). The DCT-type decision block 510 can determine whether 8×8 or 2×4×8 type DCT should be performed on the retrieved video data. The retrieved video data is then provided to a DCT block 512 which is configured to perform the discrete cosine transformation on the retrieved data. The DCT block 512 will perform the DCT operation on the retrieved data in accordance with the DCT-type decision made by the DCT-decision block 510. The transformed data from the DCT block 512 is stored in memory buffers 514a–b and 516a–b. The memory buffers 514a–b can be identical. Similarly, the memory buffers 516a–b can be identical. The memory buffers 514a–b preferably store 1 k×20 bits of data. Memory buffers 516a–b preferably store 64×10 bits of data. Such a configuration will allow storage of one video segment in each of the memory buffers 514a–b. As detailed above, each video segment includes five (5) macro blocks and each macro block includes six (6) blocks of 8×8 pixels. Also, such a configuration will permit the memory buffers 516a–b to each store one 8×8 block of DCT transformed data. The memory buffers 514a–b and 516a–b will act as back and forth memory buffers, i.e., each time one memory buffer is filled, incoming data will be stored in the other memory buffer. Similarly, when data is read from one memory, the other memory buffer is being filled. For example, with respect to the memory buffers 516a–b, if the 0th 8×8 block is stored in the memory buffer 516a, the 1st block of the 8×8 block data is stored in the memory buffer 516b. Similarly, the 2nd 8×8 block is stored in the memory buffer 516a and the 3rd 8×8 block of data is stored in the memory buffer 516b. The 8×8 blocks stored in the memory buffers 516a–b are input into a length-decision video encoder 518. The length-decision video encoder 518 receives the frequency-domain pixel information transformed by the DCT block 512.

In contrast with other types of compression techniques, DV video encoding incorporates a few dynamically adjusted parameters to help maintain the video compression ratio at around 5:1. These parameters include the DCT-type (8×8 or 2×4×8), class number (0, 1, 2, and 3), Quantization or Q factor (0–15), and limited selection of quantization factor (powers of 2, simplifying implementation). These parameters are related to both the spatial-domain information (before DCT) and the frequency-domain information (after DCT). The almost constant compression ratio requirement can be maintained by determining the appropriate compression factors before any actual compression is performed. For example, the length-decision video encoder 518 determines the length information necessary for variable length coding (VLC).

There are sixteen possible Q factors (also know as "Q-numbers"). The length-decision video encoder 518 determines the length information for the received data from X the memory buffers 516a–b based on five out of the sixteen possible Q factors. The reason for choosing only five of the sixteen possible Q-numbers is to reduce the number of computations and comparisons. The length-decision video encoder 518 computes the length for each of the Q-numbers, which is then used to look up an encoded length from an encoding table. Preferably, the five Q-numbers used are 0, 3, 7, 11, and 15 to provide a more dynamic range of values.

After the length decision, the data is input to a smart encoder 520. The smart encoder 520 determines which Q factors would provide the best compression based on the length decision for each block of 8×8 data. The selected Q-numbers are provided to compression block 522 for application to video segments stored in the memory buffers 514a–b. The compression block 522 can also include a code-decision video encoder for variable length coding. The smart encoder 520 also provides length information to a code packing block 524. The smart encoder 520 can also provide information to a code packing block 524. Such information can, for example, include length information, selected Q-numbers, class numbers, DCT-type, and the like. The length information includes data about length of data stored in each macro block. The code packing block 524 receives the compressed data from compression block 522 and the macro block length information from smart encoder 520. The code packing block 524 arranges video data efficiently into a bitstream. The code packing block 524 is coupled to a system multiplexer 526. The system multiplexer 526 also receives audio data from the memory 506 and header information from a header block 528. The audio information can be from the audio node 508, and other sources of audio, such as audio overlays, editors, and the like. The header information can be input from outside the system. For example, external information such as close captioning, Tele-text, or different language subtitles, can be received from an external input 530.

The system multiplexer 526 arranges the outgoing data based on timing considerations to recreate real-time data in an appropriate order. The output of the system multiplexer 526 is coupled to a host buffer 532. The host buffer 532 is coupled to a host bus 534. The host buffer 532 ensures that data is buffered before it is provided to the host bus 534. Such a configuration will, for example, ensure that data will not be lost if the host bus is busy. The code packing block 524 can be coupled to the system multiplexer 526 through a pair of memory buffers similar to the memory buffers 514a–b (not shown). Such memory buffers would have a similar configuration, i.e., one would be read from while another is receiving data. The size of these memory buffers is preferably 385 bytes each. The system multiplexer unit 536 will provide control data to the system multiplexer 526 based on timing considerations to recreate real-time data flow in an appropriate order. Accordingly, the digital audio data received on the audio node 508 and the digital video data received on the video node 502 will be converted to DV format data by system 306 and output at node 534.

Figure 4:
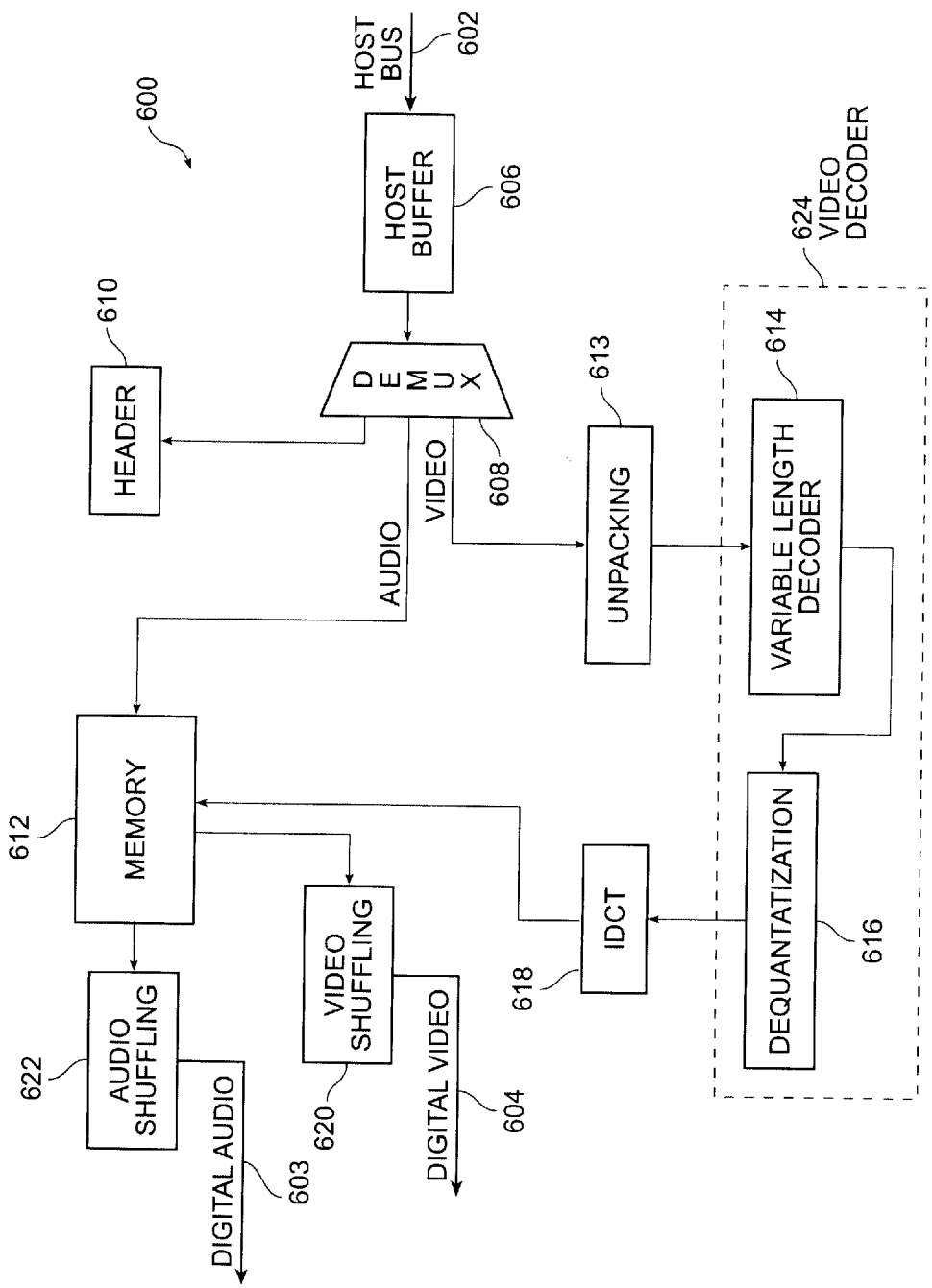
FIG. 4 illustrates a simplified block diagram of a system for converting DV data to digital data.

FIG. 4 illustrates a simplified block diagram of a system 600 for converting DV data received at a host node 602 to digital audio and video data which are respectively output at a digital audio node 603 and a digital video node 604. The DV data from the host node 602 is received by a host buffer 606. The host buffer 606 buffers the DV format data and provides the data to a demultiplexer 608. The demultiplexer 608 demultiplexes the DV data received from the host buffer 606 and provides header data to a header block 610, audio data to a memory 612, and video data to an unpacking block 613. The header data can be information such as close captioning, Tele-text, different language subtitles, and other data embedded in the DV format data. The memory 612 can be any type of storage such as DRAM, EDO DRAM, SDRAM, VRAM, SRAM, and the like. The memory 612 can also provide storage for devices within the system 600. Moreover, some elements of the system 600 can have their own local memory.

The unpacking block 613 is configured to convert the bitstream data to bitstreams for each video block and provide these unpacked blocks of data to a video decoder 624. The video decoder 624 receives 16 bit data and decodes the bitstream into individual pixel values. The video decoder 624 includes a variable length decoder 614 and a dequantization block 616. The variable length decoder 614 decodes the DV video data in accordance with variable length decoding techniques. The output of variable length decoder 614 is coupled to the dequantization block 616 which dequantizes the DV bitstream in accordance with embedded dequantization factors. The dequantization block 616 is coupled to an inverse DCT (IDCT) block 618 which is configured to perform inverse discrete cosine transformation on the dequantized bitstream. The IDCT operation converts data from the frequency domain to the spatial domain. In an alternative embodiment of the present invention, two memory buffers (not shown) can be coupled between the dequantization block 616 and the IDCT block 618. In such an embodiment, the memory buffers are RAMs, each having a storage capacity of 1 k×20. The spatial domain video data is then stored in the memory 612. A video shuffling block 620 retrieves the stored video data from the memory 612 and arranges the video data in an appropriate order if necessary. The video shuffling block 620 can also perform operations such as interpolation and filtering on the retrieved video data. For example, the video shuffling block 620 can perform a seven-tap horizontal filter which would convert a 4:1:1 format video data to a 4:2:2 format video data. Also, a three-tap vertical filter can be performed by the video shuffling block 620 to convert video data from 4:2:0 to 4:2:2 format. The output of the video shuffling block 620 can then be converted to analog format. At this stage, a chip such as Phillips Electronics® SAA7121 can be used to perform the conversion operations.

Similarly, an audio shuffling block 622 retrieves the stored audio data from the memory 612 and arranges the audio data in an appropriate order if necessary. The audio shuffling block 622 can also perform operations such as interpolation and filtering on the retrieved audio data. The output of the audio shuffling block 622 can then be converted to analog format. At this stage, a chip such as Phillips Electronics® UDA1344 can be used to perform the conversion operations.

With respect to audio data shuffling, the Blue Book discusses two modes: a National Television System Committee (NTSC) standard and a Phase Alternation System (PAL) standard. The NTSC standard and the PAL standard differ in various respects that will be readily appreciated by those of ordinary skill in the art. For example, the two standards have different frame speeds and different video sizes. The NTSC standard is commonly used in the United States, while the PAL standard is commonly used in Europe and South America. Significantly, the NTSC standard and the PAL standard also require different techniques to shuffle audio data. The NTSC standard and the PAL standard each can operate in a two channel mode (sometimes referred to as a "16-bit mode") or a four channel mode (sometimes referred to as a "12-bit mode").

Audio data shuffling under either standard or mode involves processing a bitstream. The bitstream represents a sequence of samples taken from an analog audio signal. Because the samples may be taken from stereo or other applications, the samples will be paired. A first sample can correspond to a left channel while a second sample, which immediately follows the first sample, can correspond to the right channel, or vice versa. Initially, each sample is 16 bits. However, before the samples are shuffled and stored, each sample in the four channel mode is compressed to have 12 bits in both the NTSC standard and the PAL standard. In the two channel mode, each sample will remain 16 bits.

Each sample from the sequence of samples has a value Dn, where D represents the data corresponding to the nth sample in the sequence. The samples are shuffled according to the following conventional audio shuffling equations:

|  | 2-CH (CH$_1$ or CH$_2$) | 4-CH (CH$_a$/CH$_b$ or CH$_c$/CH$_d$) |
|---|---|---|
| NTSC |  |  |
| TK | ( [n/3] + 2* (n%3) ) %5 (for CH$_1$) | ( [n/3] + 2* (n%3) ) %5 (for CH$_a$/CH$_b$) |
|  | ( [n/3] + 2* (n%3) ) %5 + 5 (for CH$_2$) | ( [n/3] + 2* (n%3) ) %5 + 5 (for CH$_c$/CH$_d$) |
| BK | 3* (n%3) + [ (n%45)/15] | 3* (n%3) + [ (n%45)/15] |
| DP | [n/45] | [n/45] |
| PAL |  |  |
| TK | ( [n/3] + 2* (n%3) ) %6 (for CH$_1$) | ( [n/3] + 2* (n%3) ) %6 (for CH$_a$/CH$_b$) |
|  | ( [n/3] + 2* (n%3) ) %6 + 6 (for CH$_2$) | ( [n/3] + 2* (n%3) ) %6 + 6 (for CH$_c$/CH$_d$) |
| BK | 3* (n%3) + [ (n%54)/18] | 3* (n%3) + [ (n%54)/18] |
| DP | [n/54] | [n/54] |

(hereinafter "the conventional audio shuffling equations") where n is the nth pair of audio data {Dn(L), Dn(R)} in a frame, and Dn(L) and Dn(R) represent left channel and right channel audio data, respectively; TK=track number; BK=block number; DP=data position number; CH1 and CH2 each represent a channel in the two channel mode; and, CHa,b and CHc,d each represent channel pairs in the four channel mode.

The values of TK, BK, and DP provide address generation information relating to the location of a particular sample of audio data in a frame. In the NTSC standard, each frame has 10 tracks while, in the PAL standard, each frame has 12 tracks. Each track includes nine blocks. In the four channel mode, the value of DP is between zero and 23 while, in the two channel mode, the value of DP is between zero and 35. After the audio data is shuffled in accordance with the conventional audio shuffling equations above, and accordingly stored in a frame, the audio data will be accessed, or output, in an output sequence N. The order of a particular sample in the output sequence is determined by the values of TK, BK, and DP for that sample according to the following equation:

$$N=(TK*9+BK)*36+DP$$

It will be appreciated that the implementation of the conventional audio shuffling equations above for both the NTSC standard and the PAL standard present various drawbacks. For example, because the conventional audio shuffling equations for the NTSC standard are different from those of the PAL standard, separate hardware is necessary to perform calculations associated with each system. As another example, to perform the calculations requires the use of a multiplier and a divider. Such use is costly in terms of the devoted space required on an integrated circuit to accommodate the multiplier and divider.

The method and apparatus for providing audio in a digital video system in accordance with the present invention provides a simple, efficient technique to perform audio data shuffling in applications involving the NTSC standard and the PAL standard in accordance with DV specifications. The present invention can be implemented in the audio processor 412 and the memory 422 of FIG. 2, or the audio shuffle block 509 and the memory 506 of FIG. 3. Of course, the present invention could be implemented in other appropriate environments involving audio data shuffling as well. With respect to FIG. 2, for example, a bitstream of audio data is provided from the codec 410 to the audio processor 412. As described in more detail below, the audio processor 412 processes the audio data by shuffling the audio data and generating address information corresponding to locations in the memory 422 to which the audio data will be stored. In a one embodiment of the present invention, the memory 422 is an EDO DRAM, with each page having a storage capacity of 512×32 bits. Of course, other kinds of memories having other capacities could also be used. The shuffled audio data is provided to the memory 422 and stored therein according to the generated address information. The audio data stored in the memory 422 is then provided from the memory 422 through the MUX 414. The audio data, along with other video data and header information, appears at the output of the MUX 414 in the form of a DV bitstream.

More specifically, the output of the codec 410, which is in the form of a bitstream of audio data, is shuffled in a manner in accordance with the present invention that generates address information to allow each sample to be appropriately stored in the memory. To simplify the calculation of the conventional audio shuffling equations associated with the NTSC standard, the value n is determined from the following equation:

$$n=540*A4[1:0]+45*A3[3:0]+15*A2[1:0]+3*A1[2:0]+A0[1:0] \quad \text{(formula a)}$$

where A0=0 . . . 2; A1=0 . . . 4; A2=0 . . . 2; A3=0 . . . 11; and, A4=0 . . . 3. Formula a can be implemented by an appropriately designed counter. By replacing n into the conventional audio shuffling equations above for the NTSC standard, the values of TK, BK, and DP can be determined by the following equations:

$$TK=(A1[2:0]+A0[1:0])\%5 \quad \text{(formula b)}$$

$$BK=A2[1:0]+3*A0[1:0] \quad \text{(formula c)}$$

$$DP=12*A4[1:0]+A3[3:0] \quad \text{(formula d)}$$

To simplify the calculation of the conventional audio shuffling equations associated with the PAL standard, the value n is determined from the following equation:

$$n=648*A4[1:0]+54*A3[3:0]+18*A2[1:0]+3*A1[2:0]+A0[1:0] \quad \text{(formula e)}$$

where A0=0 . . . 2; A1=0 . . . 5; A2=0 . . . 2; A3=0 . . . 11; and, A4=0 . . . 3. Formula e can be implemented by an appropriately designed counter. By replacing n into the conventional audio shuffling equations above for the PAL standard, the values of TK, BK, and DP can be determined by the following equations:

$$TK=(A1[2:0]+A0[1:0])\%6 \quad \text{(formula f)}$$

$$BK=A2[1:0]+3*A0[1:0] \quad \text{(formula g)}$$

$$DP=12*A4[1:0]+A3[3:0] \quad \text{(formula h)}$$

In accordance with the present invention, the equations to determine the value n for the NTSC standard and the PAL standard differ only by the value of A1. In addition, the calculation of TK in the NTSC standard and the PAL standard differ.

The use of the equations in accordance with the present invention, for example, formulae a–h above, to determine values of n, TK, BK, and DP can be implemented in various ways. For example, one embodiment of an implementation to perform the calculations of the equations could include simple combinational logic, for example, a counter, adder, and shifter which, when appropriately combined, could perform calculations equivalent to multiplication and division. By providing the innovative equations to calculate values of n, TK, BK, and DP, the present invention obviates the burdensome need for a divider and multiplier, as would be required to perform the calculations of the conventional audio shuffling equations. Furthermore, as another example, look-up tables could be implemented in an embodiment of the present invention to efficiently perform certain calculations.

In one embodiment of the present invention, the samples of audio data are stored in the portions of the memory 422 that do not contain video data. The last 32 entries of each page of the memory 422 are selectively used to store audio data. To determine the precise location of a sample in a particular page of memory, after having determined the values TK, BK, DP in accordance with the present invention, as discussed above, a page value and an offset value are determined. The page value indicates the particular page on which a sample is to be stored. The offset value indicates the particular location of a sample on a particular page. For either the NTSC standard or the PAL standard, the page value is determined from the following equation:

$$page=[N/12]=27*TK+BK+A4[2:0] \quad \text{(formula i)}$$

For either the NTSC standard or the PAL standard, the offset value is determined from the following equations:

$$\text{offset}=N\%12=A3[3:0] \text{ (CH1 at two channel mode or CHa,b at four channel mode)} \quad \text{(formula j)}$$

$$\text{offset}=N\%12+16=A3[3:0]+16 \text{ (CH2 at two channel mode or CHc,d at four channel mode)} \quad \text{(formula k)}$$

Figure 5:
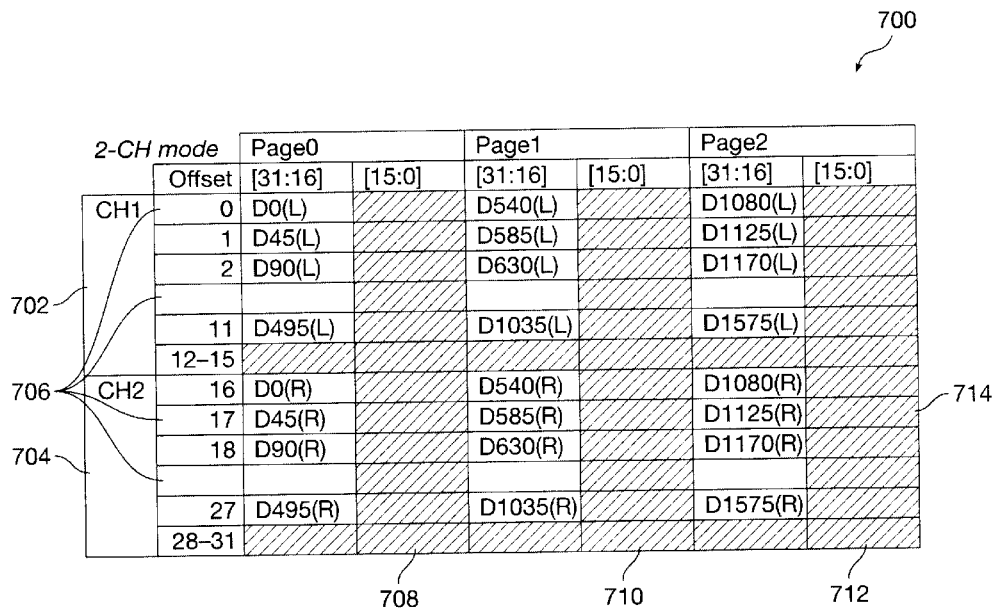
FIG. 5 illustrates a simplified portion of a frame having pages of shuffled audio data for a two channel mode in accordance with the present invention.

FIG. 5 is an exemplary graphical representation 700 of an audio data shuffling pattern based on the equations provided above for a two channel mode in accordance with the present invention. The representation 700 could be a portion of the memory 422, as described above. The representation 700 includes a CH1 portion 702 and a CH2 portion 704. The representation 700 contains 32 entries. Each entry 706 corresponds to an offset number between 0 and 31. The representation 700 also includes three pages: a page0 portion 708, a page1 portion 710, and a page2 portion 712. The simplified representation of three pages also reflects other pages of an entire frame, as discussed below with respect to FIG. 7.

An entry for each page has a capacity of 32 bits. As is true for an audio shuffling pattern for a two channel mode, like the type illustrated in FIG. 5, the left data of a pair of audio data will be shuffled to have a location within the CH1 portion 702 while the right data of a pair of audio data will be shuffled to have a location within the CH2 portion 704. The relative location of the left data and the right data in the CH1 portion 702 and the CH2 portion 704, respectively, are similar.

For example, consider the first pair of audio data {D0(L), D0(R)}, i.e., when n=0, of the representation 700. Under the shuffling equations the audio data D0(L), the value of the page is zero and the value of the offset is zero. For the audio data the value of the page is zero and the value of the offset is 16. As another example, consider the one thousand thirty fifth pair of audio data {D1035(L), D1035(R)}, i.e., when n=1035, of the representation 700. Under the shuffling equations, for the audio data D1035(L), the value of the page is one and the value of the offset is 11. For the audio data D1035(R), the value of the page is one and the value of the offset is 27. Shaded areas 714 are not used in the audio shuffling pattern. In particular, bits [15:0] for each entry 706 of a page are not used. Furthermore, bits [31:16] of entries associated with offset numbers 12–15 and 28–31 are not used.

Figure 6:
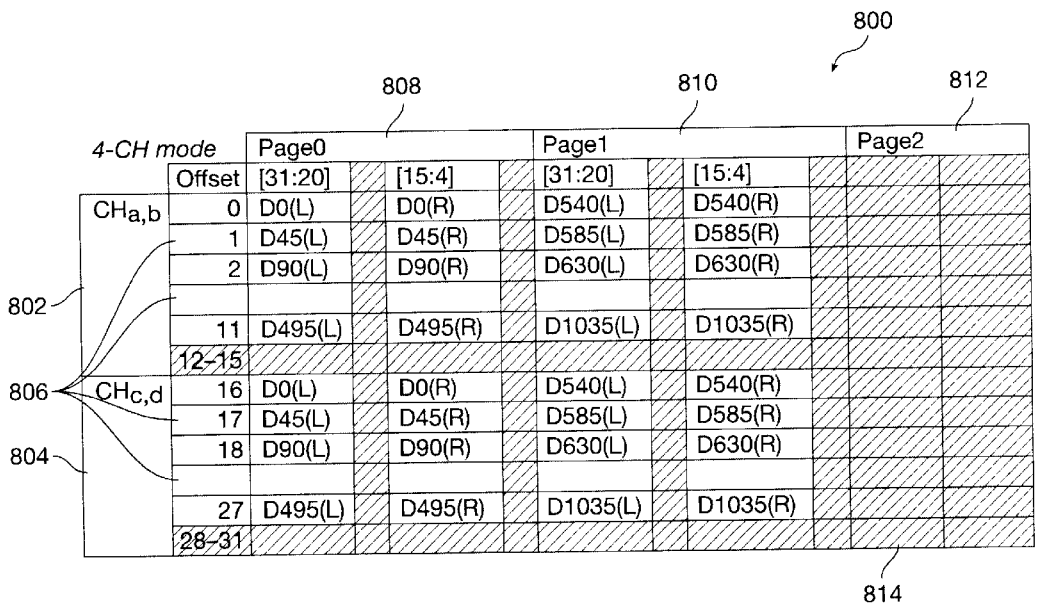
FIG. 6 illustrates a simplified portion of a frame having pages of shuffled audio data for a four channel mode in accordance with the present invention; and, FIG. 7 illustrates a frame including pages of the type illustrated in FIG. 5 and FIG. 6.

FIG. 6 is an exemplary graphical representation 800 of an audio data shuffling pattern of the equations provided above for a four channel mode in accordance with the present invention. The representation 800 includes a CHa,b portion 802 and a CHc,d portion 804. The representation 800 contains 32 entries. Each entry 806 corresponds to an offset number between 0 and 31. The representation 800 also includes three pages: a page0 portion 808, a page1 portion 810, and a page2 portion 812. The simplified representation of three pages also reflects other pages of an entire frame, as discussed below with respect to FIG. 7.

An entry for each page has a capacity of 32 bits. As is true for an audio shuffling pattern for a four channel mode, like the type illustrated in FIG. 6, the left data and the right data of a pair of audio data will be shuffled so that the left data and the right data are located in a single entry. In particular, the left data will occupy bits[31:20] of an entry while the right data will occupy bits [15:4] of the same entry. Accordingly, because the left data and the right data of a pair of audio data are in a common entry, for a given application, only the CHa,b portion 802 or the CHc,d portion 804 are used, but not both, as is true in applications involving the two channel mode illustrated in FIG. 5.

For example, with respect to FIG. 6, consider the first pair of audio data {D0(L), D0(R)}, i.e., when n=0, of the representation 800. Under the equations in accordance with the present invention, for the audio data D0(L), the value of the page is zero and the value of the offset is zero when the portion CHa,b 802 is used. For the audio data D0(R), the value of the page is zero and the value of the offset is zero when the portion CHa,b 802 is used. Alternatively, for the audio data pair {D0(L), D0(R)}, the value of the page can be zero and the value of the offset can be 16 when the portion CHc,d is used. As another example, consider the one thousand thirty fifth pair of audio data {D1035(L), D1035(R)}, i.e., when n=1035, of the representation 800. Under the equations, for the audio data D1035(L), the value of the page is one and the value of the offset is 11 when the portion CHa,b is used. For the audio data D1035(R), the value of the page is one and the value of the offset is 11 when the portion CHa,b is used. Alternatively, for the audio data pair {D1035(L), D1035(R)}, the value of the page can be zero and the value of the offset can be 27 when the portion CHc,d is used. Shaded areas 814 are not used in the audio shuffling pattern. In particular, bits [0:3] and bits [16:19] for each entry 806 of a page are not used. Furthermore, bits [31:0] of entries associated with offset numbers 12–15 and 28–31 as well as all entries of the page2 portion 814 are not used.

FIG. 7 is a simplified depiction of an entire frame 900 containing pages 906 like the pages detailed in FIGS. 5 and 6. Under the NTSC standard, the frame 900 includes ten tracks. Each track under the NTSC standard is designated by a track number TK0, TK1, TK2, TK3, TK4, TK5, TK6, TK7, TK8, or TK9. Under the PAL standard, the frame 900 includes 12 tracks. Each track under the PAL standard is designated by a track number TK0, TK1, TK2, TK3, TK4, TK5, TK6, TK7, TK8, TK9 TK10, or TK11. Each track includes nine blocks 906. Each block 906 includes three pages 908. For each block 906, only 72 bytes are used to store shuffled audio data. Under the NTSC standard, the following pairs of tracks will contain identical information: TK0 and TK5; TK1 and TK6; TK2 and TK7; TK3 and TK8; and, TK4 and TK9. Under the PAL standard, the following pairs of tracks will contain identical information: TK0 and TK6; TK1 and TK7; TK2 and TK7; TK3 and TK9; and, TK4 and TK10; and, TK5 and TK11.

The techniques of the present invention are readily implemented in an integrated circuit to allow the efficient compression and decompression of digitally encoded images, while consuming a minimal amount of integrated circuit area. The techniques of the present invention comply with the Digital Video Standard (the "Blue Book"). These techniques can also be of use in systems implementing other standards, such as the International Standards Organization's (ISO) Joint Photographic Experts Group (JPEG) standard, ISO DIS 10918-1, and is JPEG-compliant, as set forth in ISO DIS 10918-2. These standards are included by reference herein, in their entirety. Moreover, the techniques of the present invention can be understood in the framework of a JPEG image compression/decompression system, such as that outline in "JPEG Still Image Data Compression Standard" by W. B. Pennebaker and J. L. Mitchell, which is also included by reference herein, in its entirety.

As will be understood by those with ordinary skill in the art, the present invention may be embodied in other specific forms without departing from the spirit or essential characteristics thereof. For example, the techniques of the present invention can also be applied to other compression systems such as the standards specified by Motion Picture Experts Group (MPEG), or MPEGII. These standards are included by reference herein, in their entirety and for all purposes.

Alternately, the techniques of the present invention can be implemented in a computer system. For example, present invention can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Moreover, the techniques of the present invention can be implemented by utilizing the available routines and features such as caching, new instruction sets, and single instruction multiple data (SIMD) tools which are provided by Intel® Corporation's MMX™ technology, Advance Micro Device,® Inc.'s 3DNow!™ technology, and their equivalents. Additionally, even though the techniques of the present invention have been discussed with respect to DCT transformation other types of transformations can also be utilized such as wavelet transform and vector quantization (VQ). Accordingly, for an understanding of the scope of the invention, reference should be made to the appended claims.

Also, having fully described certain features of the preferred embodiments of the present invention, many other equivalents or alternative techniques of implementing bit-shuffling according to the present invention will be apparent to those with ordinary skill in the art. Other signal processing applications that employ such bitstreams may benefit from the present invention. Also, the implementation shown in the figures is but one of many possible architectures which may be designed to take advantage of the method of the present invention. These equivalents and alternatives, and others, are intended to be included within the scope of the present invention. Accordingly, for an understanding of the scope of the invention, reference should be made to the appended claims.

As will be understood by those with ordinary skill in the art, the present invention may be embodied in other specific forms without departing from the spirit or essential characteristics thereof. Also, implementations shown in the figures or described in text are but some of many possible architectures which may be designed to take advantage of the method and apparatus of the present invention. Equivalents and alternatives, and others, are intended to be included within the scope of the present invention. Accordingly, for an understanding of the scope of the invention, reference should be made to the appended claims.

What is claimed is:

1. A method for storing digital audio data in a memory having digital video data stored in a first portion of the memory comprising:

determining a value n, wherein the determining includes using the equation:

$$n = 648*A4[1:0] + 54*A3[3:0] + 18*A2[1:0] + 3*A1[2:0] + A0[1:0] \quad \text{(formula e)}$$

where $A0 = 0 \ldots 2$; $A1 = 0 \ldots 5$; $A2 = 0 \ldots 2$; $A3 = 0 \ldots 11$; and, $A4 = 0 \ldots 3$;

calculating a set of values based on the value of n;

shuffling the digital audio data according to the set of values; and storing the digital audio data in a second portion of the memory, the second portion being different from the first portion.

2. The method of claim 1 wherein the calculating includes determining values of TK, BK, and DP by using the equations:

$$TK=(A1[2:0]+A0[1:0])\%6 \quad \text{(formula f)}$$

$$BK=A2[1:0]+3*A0[1:0] \quad \text{(formula g)}$$

$$DP=12*A4[1:0]+A3[3:0] \quad \text{(formula h)}.$$

3. The method of claim 2 wherein the calculating includes determining a page value using the equation:

$$\text{page}=[N/12]=27*TK+BK+A4[2:0] \quad \text{(formula i)}$$

where N is an output sequence.

4. The method of claim 3 wherein the calculating includes determining an offset value using the equation:

$$\text{offset}=N12=A3[3:0] \quad \text{(formula j)}.$$

5. The method of claim 3 wherein the calculating includes determining an offset value using the equation:

$$\text{offset}=N\%12+16=A3[3:0]+16 \quad \text{(formula k)}$$

6. A method for storing digital audio data in a memory having digital video data stored in a first portion of the memory comprising:

determining a value n, wherein the determining includes using the equation:

$$n=540*A4[1:0]+45*A3[3:0]+15*A2[1:0]+3*A1[2:0]+A0[1:0] \quad \text{(formula a)}$$

where A0=0 . . . 2; A1=0 . . . 4; A2=0 . . . 2; A3=0 . . . 11; and, A4=0 . . . 3;

calculating a set of values based on the value of n;

shuffling the digital audio data according to the set of values; and storing the digital audio data in a second portion of the memory, the second portion being different from the first portion.

7. The method of claim 6 wherein the calculating includes determining values of TK, BK, and DP by using the equation:

$$TK=(A1[2:0]+A0[1:0])\%5 \quad \text{(formula b)}$$

$$BK=A2[2:0]+3*A0[1:0] \quad \text{(formula c)}$$

$$DP=12*A4[1:0]+A3[3:0] \quad \text{(formula d)}.$$

8. The method of claim 7 wherein the calculating includes determining a page value using the equation:

$$\text{page}=[N/12]=27*TK+BK+A4[2:0] \quad \text{(formula i)}$$

where N is an output sequence.

9. The method of claim 8 wherein the calculating includes determining an offset value using the equation:

$$\text{offset}=N\%12=A3[3:0] \quad \text{(formula j)}.$$

10. The method of claim 8 wherein the calculating includes determining an offset value using the equation:

$$\text{offset}=N\%12+16=A3[3:0]+16 \quad \text{(formula k)}.$$

11. A method for shuffling audio data comprising:

using conventional audio shuffling equations as functions of a value n;

equating the value n in the conventional audio shuffling equations with a first set of values;

replacing the value n in the conventional audio shuffling equations with the first set of values;

calculating values TK, BK, DP based on the first set of values; and storing the audio data in a memory location.

12. The method of claim 11 further comprising calculating a page value and storing the audio data on a page indicated by the page value.

13. The method of claim 11 further comprising calculating an offset value and storing the audio data in a location indicated by the offset value.

14. An apparatus for processing digital audio data comprising:

an audio processor configured to calculate a set of values by replacing an equation for a value n in conventional audio shuffling equations and shuffle the digital audio data according to the set of values; and a memory, coupled to the audio processor, configured to receive and store the digital audio data shuffled by the audio processor, wherein the audio processor processes a value n according to the equation:

$$n=648*A4[1:0]+54*A3[3:0]+18*A2[1:0]+3*A1[2:0]+A0[1:0] \quad \text{(formula e)}$$

where A0=0 . . . 2; A1=0 . . . 5; A2=0 . . . 2; A3=0 . . . 11; and, A4=0 . . . 3, to calculate values TK, BK, and DP.

15. An apparatus for processing digital audio data comprising:

an audio processor configured to calculate a set of values by replacing an equation for a value n in conventional audio shuffling equations and shuffle the digital audio data according to the set of values; and a memory, coupled to the audio processor, configured to receive and store the digital audio data shuffled by the audio processor, wherein the audio processor processes a value n according to the equation:

$$n=540*A4[1:0]+45*A3[3:0]+15*A2[1:0]+3*A1[2:0]+A0[1:0] \quad \text{(formula a)}$$

where A0=0 . . . 2; A1=0 . . . 4; A2=0 . . . 2; A3=0 . . . 1; and, A4=0 . . . 3, to calculate values TK, BK, and DP.

* * * * *